(12) United States Patent
Cheng et al.

(10) Patent No.: US 7,924,344 B2
(45) Date of Patent: Apr. 12, 2011

(54) OBJECTIVE HOLDER FOR CAMERA MODULE WITH NOTCHES OF WALL RECEIVING PASSING COMPONENTS

(75) Inventors: Su-Jen Cheng, Taipei Hsien (TW); Wen-Ching Lai, Taipei Hsien (TW); Wen-Chang Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 648 days.

(21) Appl. No.: 11/947,081

(22) Filed: Nov. 29, 2007

(65) Prior Publication Data

US 2009/0021615 A1 Jan. 22, 2009

(30) Foreign Application Priority Data

Jul. 18, 2007 (CN) .......................... 2007 1 0201120

(51) Int. Cl.
*H04N 5/225* (2006.01)
(52) U.S. Cl. .................. 348/374; 396/529; 348/335
(58) Field of Classification Search .................. 348/335, 348/373, 374; 396/529
See application file for complete search history.

(56) References Cited

U.S. PATENT DOCUMENTS

| | | | |
|---|---|---|---|
| 7,031,083 B2 | 4/2006 | Chen | |
| 7,333,147 B2 * | 2/2008 | Adachi et al. | 348/374 |
| 2007/0047952 A1 * | 3/2007 | Kim et al. | 348/374 |
| 2007/0091179 A1 | 4/2007 | Yen | |
| 2007/0183773 A1 * | 8/2007 | Aoki et al. | 396/529 |
| 2007/0212061 A1 * | 9/2007 | Woo | 396/529 |
| 2008/0231743 A1 * | 9/2008 | Tseng | 348/360 |

FOREIGN PATENT DOCUMENTS

| | | |
|---|---|---|
| CN | 03225026.6 | 7/2004 |
| CN | 1664639 A | 9/2005 |
| CN | 1952720 A | 4/2007 |

* cited by examiner

*Primary Examiner* — Gevell Selby
(74) *Attorney, Agent, or Firm* — Jeffrey T. Knapp

(57) ABSTRACT

An exemplary objective holder for engaging with a PCB substrate having an image sensor and several passive components arranged thereon, includes a base and several continuously connected walls extending from the base. The walls enclose a chamber thereamong for receiving the image sensor and define notches therein for receiving the passive components.

6 Claims, 5 Drawing Sheets

OBJECTIVE HOLDER FOR CAMERA MODULE WITH NOTCHES OF WALL RECEIVING PASSING COMPONENTS

BACKGROUND

1. Technical Field

The present invention relates to objective holders and, particularly, to an objective holder for camera module having a compact configuration.

2. Description of Related Art

In digital cameras, objective holders are in widespread use to support lenses and other components such as image sensors. Another use for objective holders is in some compact imaging apparatus as a cover for imaging components. FIG. 5 illustrates an objective holder 10, which covers the printed circuit board (PCB) substrate 20. On the PCB substrate 20, an image sensing IC 30 and several passive components 40 are arranged. The passive components 40 may be capacitances, inductances, or resistances. The passive components 40 surround the image sensing IC 30 and are separate from the image sensing IC 30 and the objective holder 10 for effectively dissipating heat and avoiding EMI. The objective holder 10 must have a large enough chamber 12 to accommodate the image sensing IC 30 and the passive components 40 therein. Therefore, the objective holder 10 is bulky, which makes miniaturization of cameras difficult.

What is needed, therefore, is an objective holder which has a compact configuration.

SUMMARY

In accordance with a present embodiment, an objective holder for engaging with a PCB substrate having an image sensor and several passive components arranged thereon, includes a base and several continuously connected walls extending from the base. The walls enclose a chamber thereamong for receiving the image sensor and define notches therein for receiving the passive components. In the embodiment, the passive components do not occupy the chamber but the notches in the walls; thus, the chamber is just for receiving the image sensor and is more compact than a chamber which is for receiving both the image sensor and the passive components. Thus, the objective holder as a whole can have a compact configuration.

Other advantages and novel features will be drawn from the following detailed description of at least one preferred embodiment, when considered in conjunction with the attached drawings.

BRIEF DESCRIPTION OF THE DRAWINGS

Many aspects of the present objective holder can be better understood with reference to the following drawings. The components in the drawings are not necessarily drawn to scale, the emphasis instead being placed upon clearly illustrating the principles of the present camera module. Moreover, in the drawings, like reference numerals designate corresponding parts throughout the several views.

DETAILED DESCRIPTION OF THE PREFERRED EMBODIMENTS

Embodiments of the present objective holder will now be described in detail below and with reference to the drawings.

Figure 1:
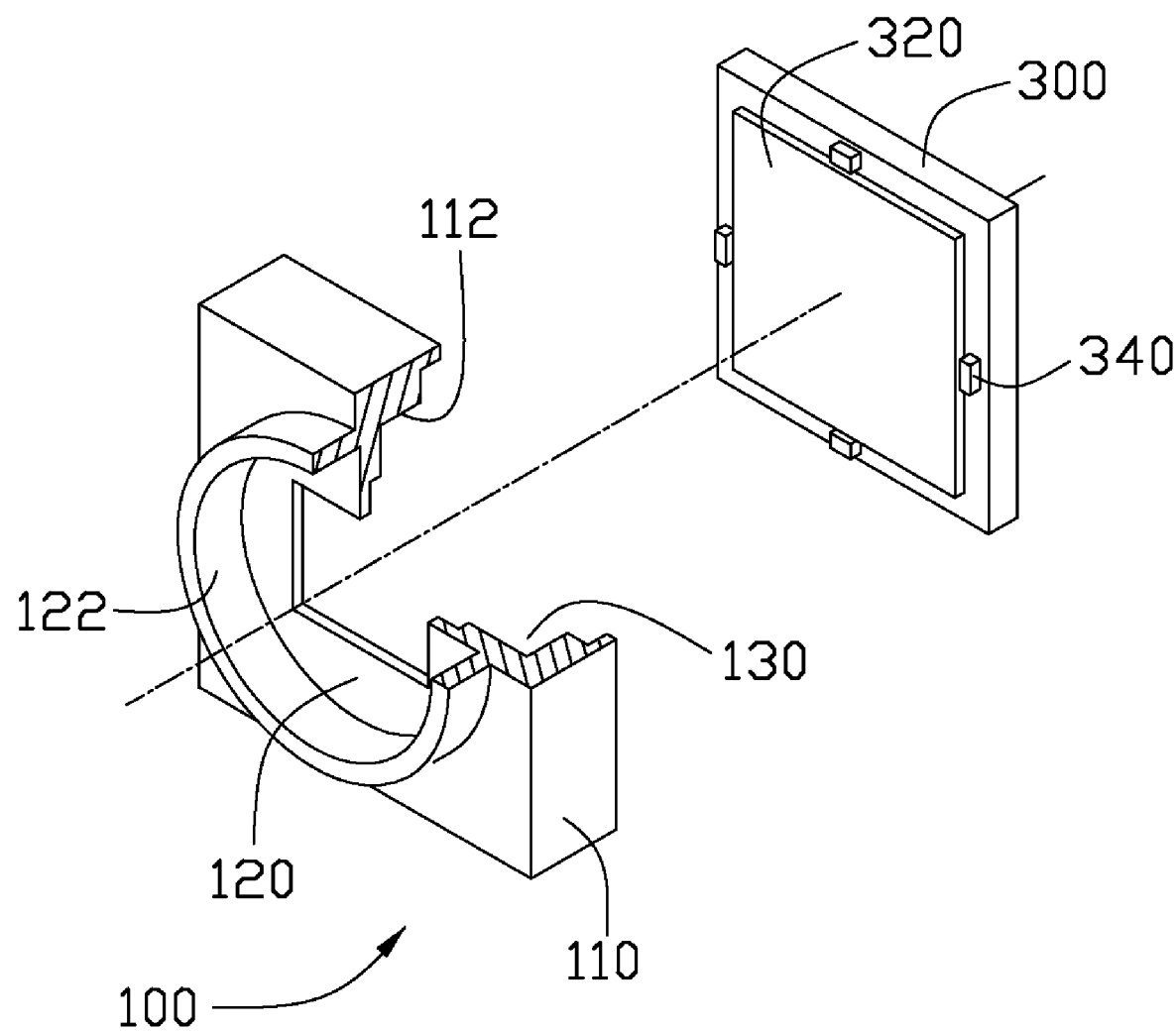
FIG. 1 is an exploded, isometric view of an objective holder and a PCB substrate on which an image sensor and several passive components are arranged, wherein the objective holder is partially cut away for clear illustration.
Figure 2:
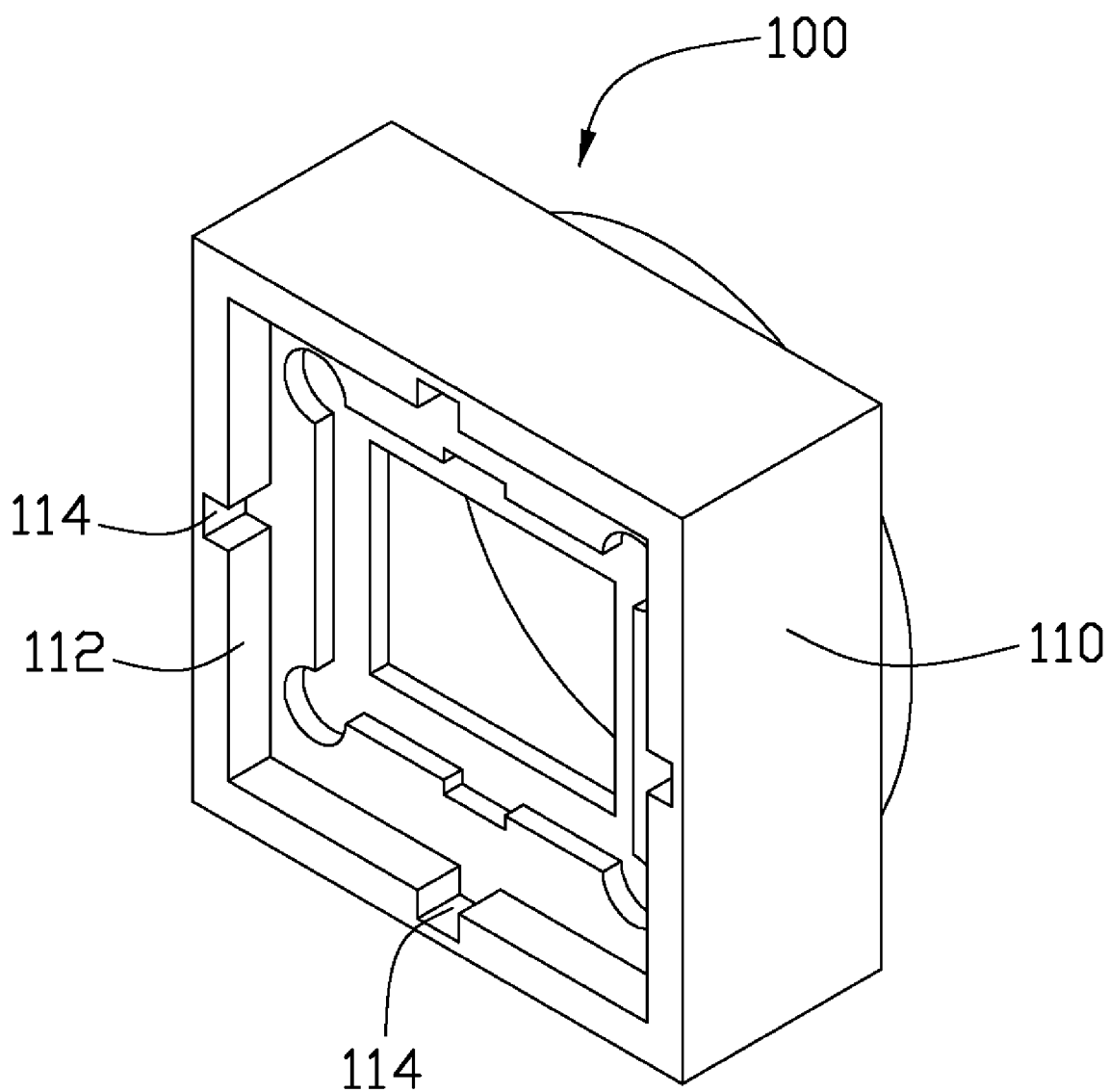
FIG. 2 is an isometric view of the objective holder of FIG. 1, but viewed from a different angle.

Referring to FIGS. 1-2, an objective holder 100 in the first embodiment may be engaged with a printed circuit board (PCB) substrate 300. An image sensor 320 and four passive components 340 are arranged on the PCB substrate 300. The passive components 340 surround the image sensor 320. The image sensor 320 may be a charge coupled device (CCD) image sensor or a complementary metal oxide semiconductor (CMOS) image sensor. The passive components 340 may be capacitors, inductors, or resistors.

The objective holder 100 comprises a base 110, a cylinder collar 122, and four walls 112. The cylinder collar 122 and the four walls 112 oppositely extend from the base 110. The cylinder collar 122 encloses a room 120 for receiving a lens module (not shown). The lens module (not shown) can be secured in the room 120 by any conventional means. The walls 112 are continuously connected together end to end and cooperatively enclose a chamber 130 thereamong. The chamber 130 is for receiving the image sensor 320 on the PCB substrate 300. The room 120 and the chamber 130 are coaxially aligned so that optical cores of the lens module (not shown) and the image sensor 320 are aligned for promoting precise imaging.

Particularly referring to FIG. 2, four notches 114 are defined in the walls 112 respectively and communicate with the chamber 130. The notches 114 are for receiving the passive components 340 therein respectively. In the embodiment, each notch 114 is located at a center portion of the corresponding wall 112, in accordance with a location of the corresponding passive component 340. When the PCB substrate 300 is placed to objective holder 100, the PCB substrate 300 is rested on the walls 112. The passive components 340 are correspondingly received in the notches 114 defined in the walls 112. The image sensor 320 is received in the chamber 130. Since the passive components 340 do not occupy the chamber 130 but the notches in the walls 112, the chamber 130 is just for receiving the image sensor 320 and is more compact than a chamber which is for receiving both the image sensor 320 and the passive components 340. For the objective holder 100 as a whole, space that would normally be occupied by the passive components can be saved compared to the above-cited reference. Thus, the objective holder 100 has a compact configuration.

Figure 3:
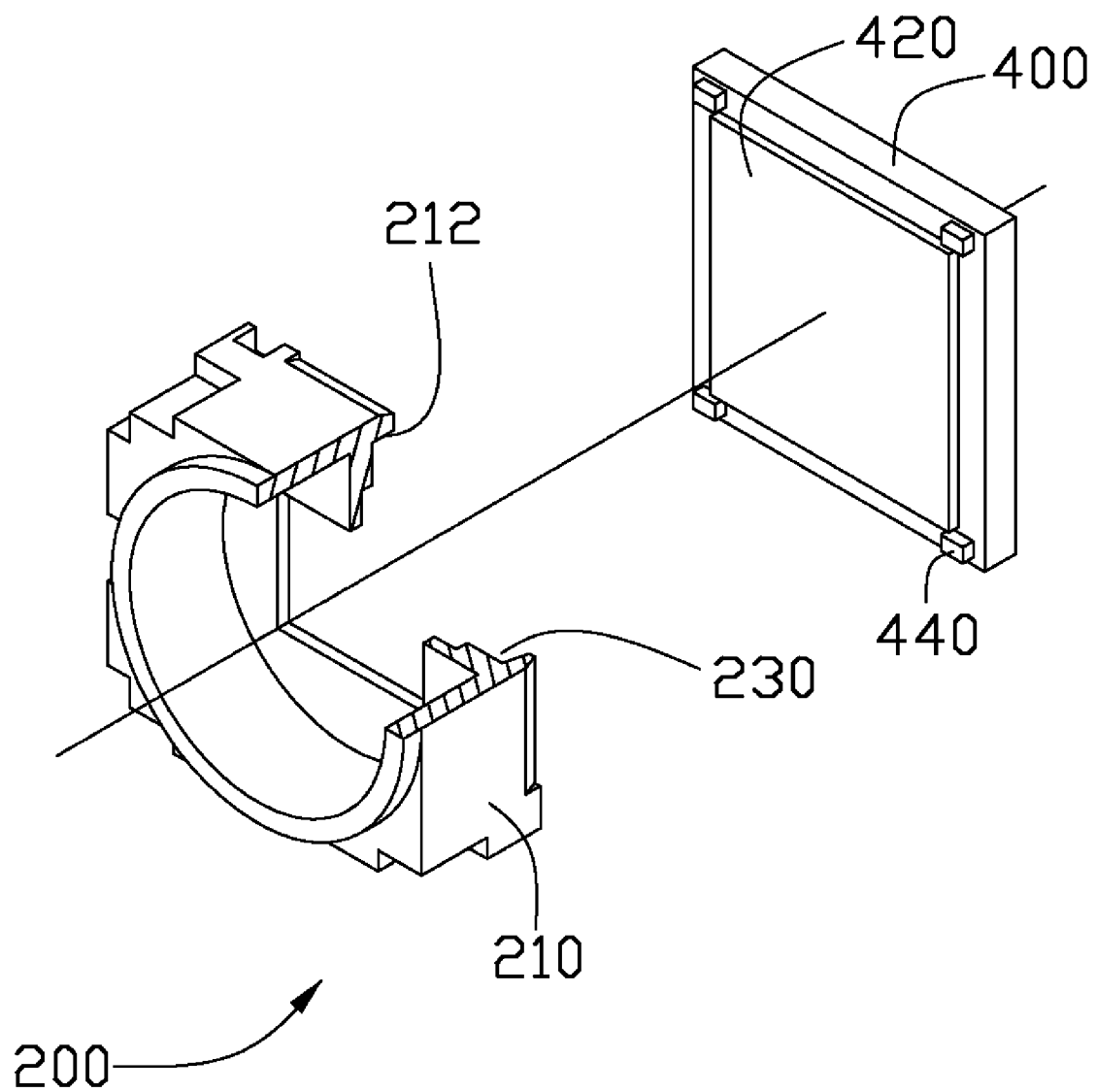
FIG. 3 is an exploded, isometric view of an alternative objective holder and a PCB substrate on which an image sensor and several passive components are arranged, wherein the objective holder is partially cut away for clear illustration.
Figure 4:
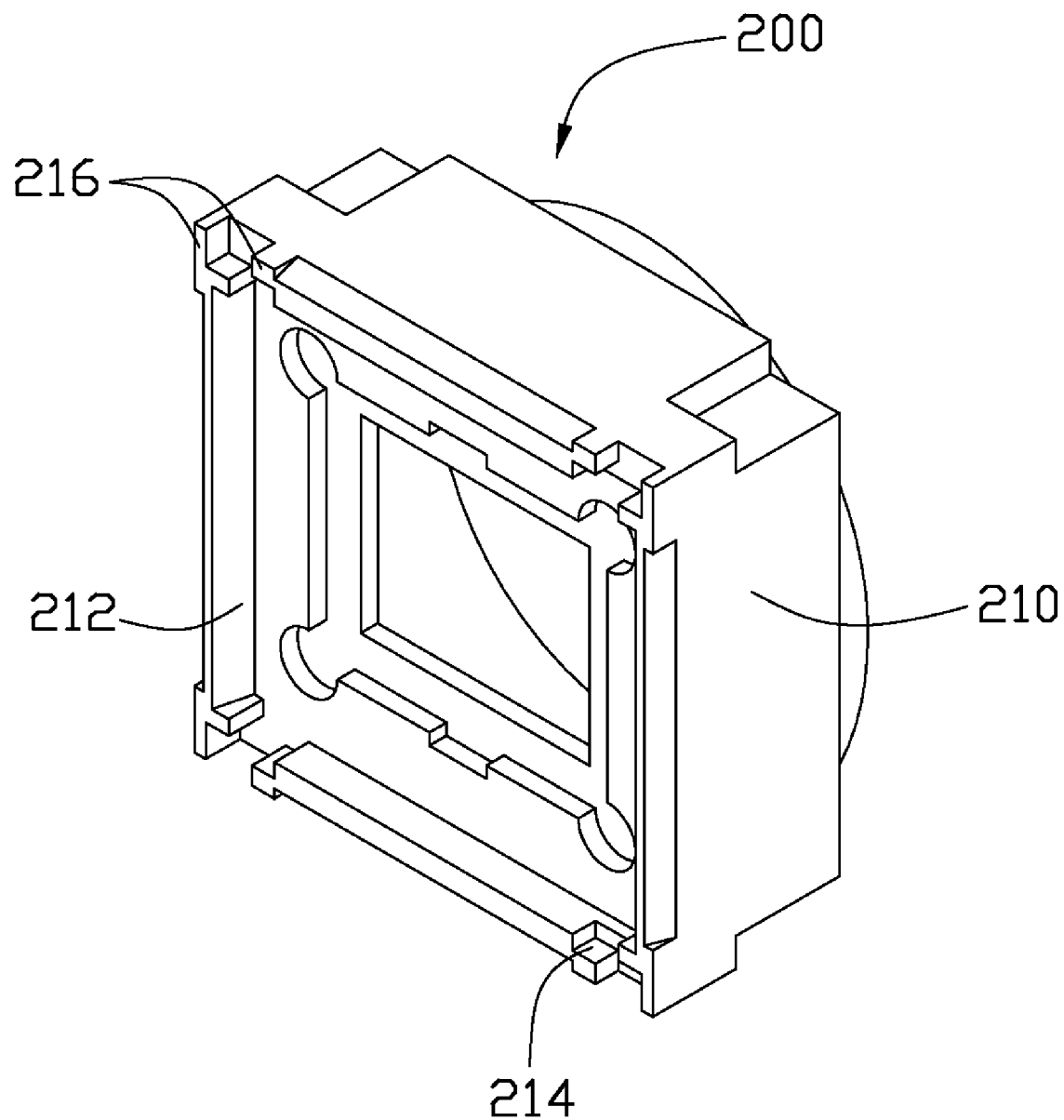
FIG. 4 is an isometric view of the objective holder of FIG. 3, but viewed from a different angle.
Figure 5:
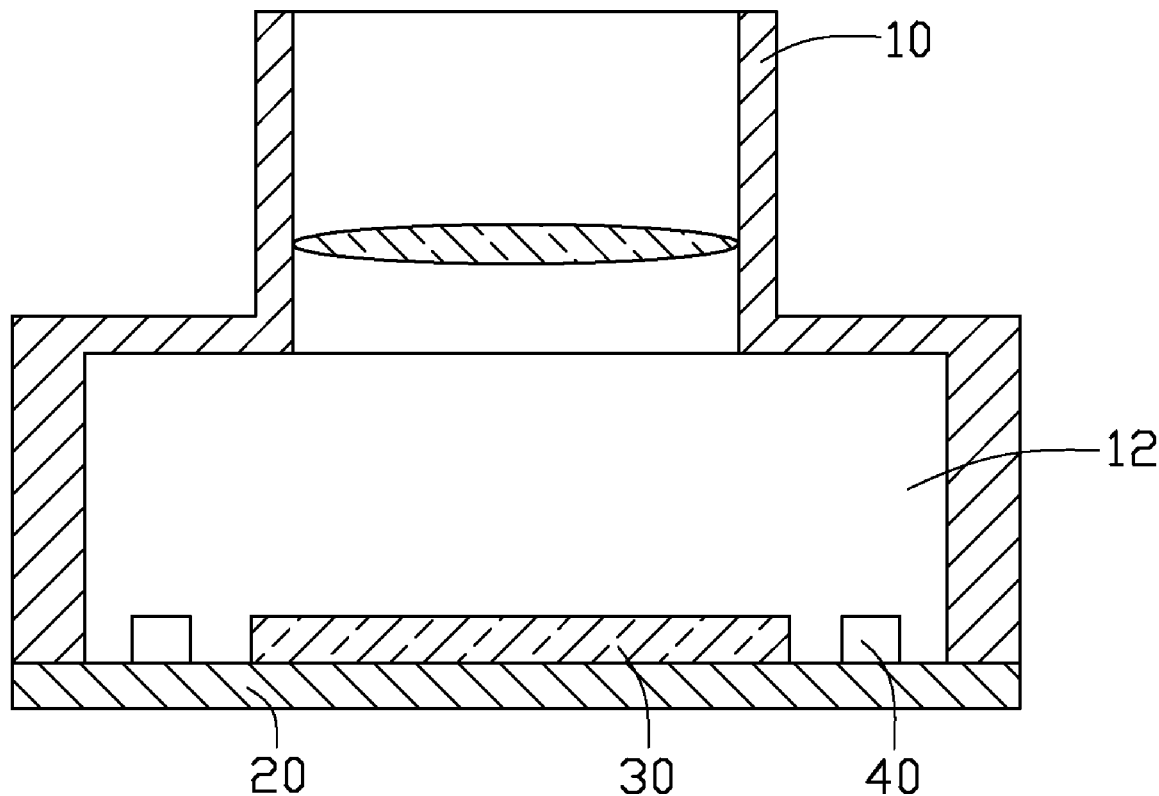
FIG. 5 is a cross-sectional view of a conventional objective holder and a PCB substrate on which an image sensor and several passive components are arranged.

Referring to FIGS. 3-4, in an objective holder 200 of a second embodiment, two notches 214 are defined in each of two parallel walls 212 respectively adjacent to the two parallel walls 212, because the passive components 440 are arranged at four corners of the PCB substrate 400 and surround the image sensor 420. In other words, the notches 214 are defined near corner portions 216 of the walls 212 to correspond to the passive components 440. It is feasible for the walls 212 to be made thinner than the parts where the notches 214 are defined so as to save material and lighten the objective holder 200. Other features such as a base 210 and a chamber 230 of the objective holder 200 in the second embodiment may be referenced from the description of the objective holder 100 in the first embodiment.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. An objective holder for engaging with a Printed Circuit Board (PCB) substrate having an image sensor and a plurality of passive components arranged thereon, the objective holder comprising a collar enclosing a room adapted for receiving a lens module, a base, and a plurality of walls extending from the base, the walls enclosing a chamber thereamong for receiving the image sensor and defining notches therein, portions of the walls are thinner than the portions of the walls where the notches are defined, the passive components being received in the notches of the walls.

2. The objective holder as claimed in claim 1, wherein each of the notches is defined at a center of the corresponding wall.

3. The objective holder as claimed in claim 1, wherein the collar and the walls extend oppositely from the base.

4. The objective holder as claimed in claim 1, wherein the room and the chamber are coaxially aligned.

5. The objective holder as claimed in claim 1, wherein the notches are defined near corners of the chamber.

6. The objective holder as claimed in claim 1, wherein the notches communicate with the chamber.

* * * * *